Nov. 1, 1966

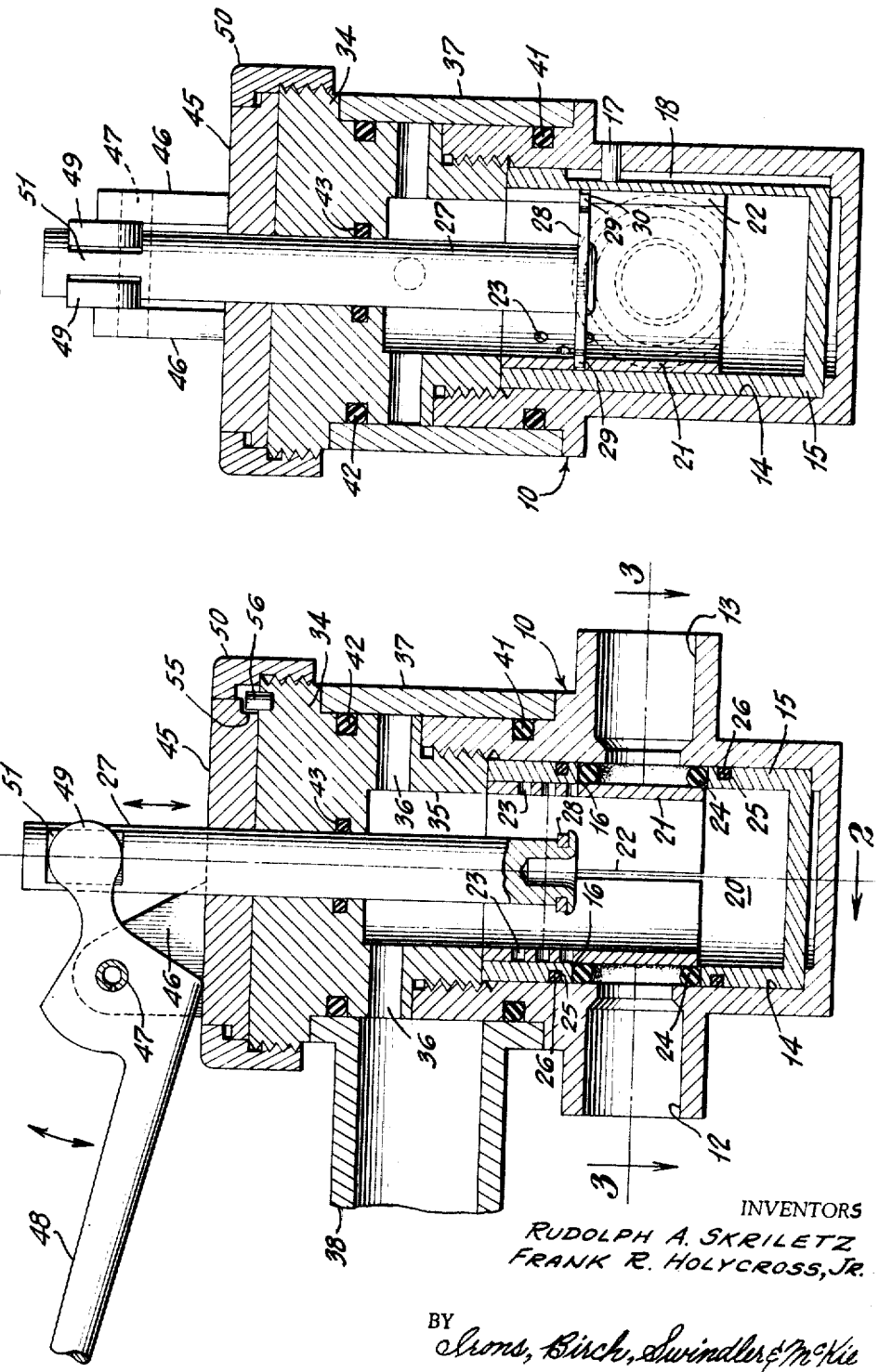

R. A. SKRILETZ ETAL 3,282,295

MIXING VALVE

Filed May 6, 1963

INVENTORS
RUDOLPH A. SKRILETZ
FRANK R. HOLYCROSS, JR.

BY *Irons, Birch, Swindler & McKie*

ATTORNEYS

United States Patent Office 3,282,295
Patented Nov. 1, 1966

3,282,295
MIXING VALVE
Rudolph A. Skriletz and Frank R. Holycross, Jr., Marysville, Ohio, assignors to The Murray Corporation of America, New York, N.Y., a corporation of Delaware
Filed May 6, 1963, Ser. No. 278,243
5 Claims. (Cl. 137—625.17)

This invention relates to the art of fluid control valves and more specifically to an improved single handle mixing valve operable to regulate the quantity of flow and proportional mixing of a plurality of fluids. Such a mixing valve finds particular application in domestic water systems where manipulation of the single handle is effective to regulate the quantity of water flow and outlet water temperature by mixing proportions of cold and hot water.

Heretofore known single handle mixing valves have not proven entirely satisfactory in permitting cross-leakage of fluid between the inlet ports of the valve where there are unequal fluid pressures in the lines connected to the inlet ports. Further, these prior valves have been subject to leakage from the inlet ports to the outlet port of the valve at high fluid pressures or after only limited usage in service. Moreover, many of the prior single handle mixing valves have required extremely close tolerances between the parts to prevent fluid leakage. This close tolerance requirements cause the valves to be difficult to assemble and add to the expense of their manufacture. Further the close tolerance requirement make the valves subject to rapid wear in use and consequently contribute to the requirement for frequent repair to avoid leakage problems such as noted above.

To overcome the disadvantages of prior art single handle mixing valves, it is an object of the present invention to provide an improved single handle mixing valve having superior sealing characteristics which eliminate cross-leakake of fluid between the inlet ports of the valve.

Another object of the invention is to provide such an improved mixing valve having superior sealing characteristics which eliminate leakage of fluids to the outlet port of the valve from the inlet ports.

A further object of the invention is to provide an improved single handle mixing valve wherein wear of the vital parts of the valve are compensated for automatically after the valve is installed and in use.

A still further object of the invention is to provide such a mixing valve which is relatively free of close tolerances, thus permitting ease of operation of the valve.

Still another object of the invention is to provide an improved single handle mixing valve which is economical to manufacture, simple to assemble and long-lasting.

Briefly, one feature of the invention involves a single handle mixing valve wherein a resiliently expandable split cylindrical valve member acting radially outwardly against seal means associated with each inlet port presses these seal means into effective sealing relation between the valve member and valve body so that wear of the seal means occasioned by use of the valve is compensated for by the valve member expanding to take up for the wear. Another feature of the invention may be briefly summarized as involving construction of a single handle mixing valve body with a sleeve housing both the valve member and the seals which are subject to wear in use of the valve so that these may be easily repaired or replaced and wherein static seals placed under effective sealing compression between the sleeve and valve body circumscribe each fluid inlet port leading into the sleeve where the flow controlling valve member is disposed.

The invention having been generally described, preferred specific embodiments of the invention will now be discussed in detail with reference to the accompanying drawings in which:

FIGURE 1 is a sectional view of a mixing valve constructed according to the principles of the present invention showing the movable valve member in a fully closed position;

FIGURE 2 is a sectional view taken along line 2—2 of FIGURE 1;

Figure 3:
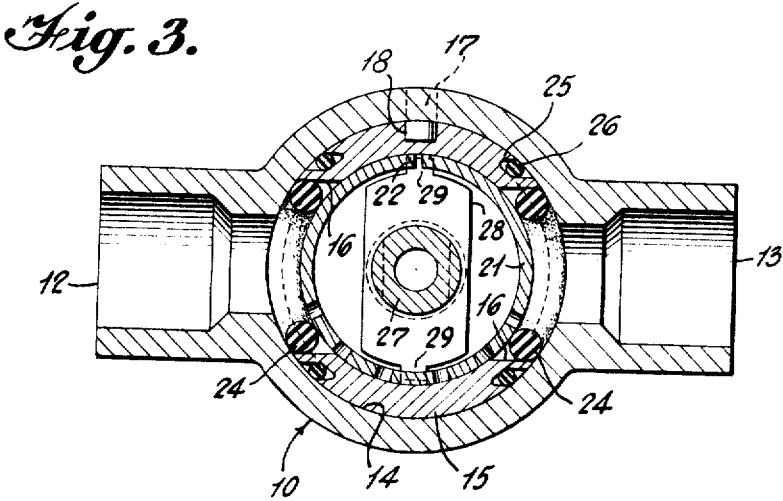
FIGURE 3 is a sectional view taken along line 3—3 of FIGURE 1.

Referring to the drawings, the mixing valve comprises a body, indicated generally by the numeral 10, having a pair of fluid inlet ports 12 and 13 formed in opposite side walls thereof so as to open into a bore 14 within the body. Inlet ports 12 and 13 may serve as the hot and cold water inlets when the valve is used in a water supply system.

Disposed within the bore 14 is a cylindrical sleeve 15 having a pair of diametrically opposed openings 16 therein adapted to overlie and be in alignment with inlet ports 12 and 13. An index pin 17 mounted in the wall of body 10 extends into bore 14 to engage groove 18 formed longitudinally in the outer surface of sleeve 15. In this manner, sleeve 15 is locked against rotation and held in a predetermined position in the bore 14 so that the sleeve openings 16 will always be in alignment with inlet ports 12 and 13. Sleeve 15 defines a mixing chamber 20 in which fluids from ports 12 and 13 are mixed and led to the valve outlet as will be explained.

Figure 5:
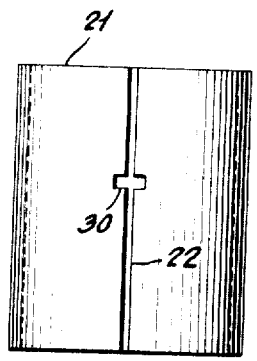
FIGURE 5 is an elevational view of the movable valve member showing the opposite side from that shown in FIGURE 4.

A valve member comprising a hollow cylinder 21 is rotatably and slidably mounted in sleeve 15. Cylinder 21 is provided with a vertical split 22 extending lengthwise thereof from top to bottom, as shown in FIGURES 2 and 5. The split cylinder which is made of material having a degree of resiliency renders the cylinder expansible so that it will adjust and compensate for wear of the seals and remove the need for extremely close tolerances between the valve parts as will become more apparent from the following description.

Figure 4:
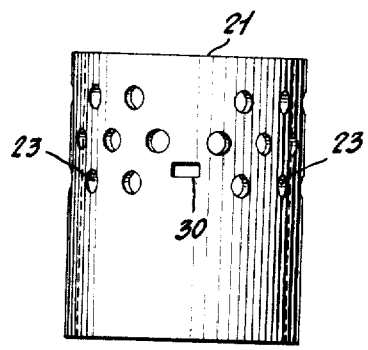
FIGURE 4 is an elevational view of one side of the movable valve member of the mixing valve.

A pair of ported areas, each comprised of a plurality of openings 23, are located in the upper portion of cylinder 21 as shown in FIGURE 4. The ported areas are separated by a small arc of the cylinder on one side and by a larger arc on the cylinder on the other side as will be apparent from a comparison of FIGURES 4 and 5 and from the showing of the openings on FIGURES 3. Movement of the cylinder 21 brings the ported areas into communication with the inlet ports 12 and 13 in the valve body to regulate in accordance with the position of the cylinder within sleeve 15 passage of fluids through the inlet ports into a mixing chamber 20 defined within sleeve 15. By moving cylinder 21 to its uppermost position as shown in FIGURE 1, communication between both inlet ports 12 and 13 and the mixing chamber 20 will be blocked. The extent of lowering of cylinder 21 will determine the quantity of fluid flow and rotation of the cylinder will vary the relative portions of the ported areas that place mixing chamber 20 in communication with the respective fluid inlet ports.

An operating stem 27 is connected to cylinder 21 by means of a key 28 having a projection 29 on each end thereof. These projections 29 engage in punched apertures 30 in the opposite walls of the cylinder 21. As shown in FIGURE 5, one of the apertures 30 is formed to bridge the split 22 of the cylinder. The bottom end of stem 37 passes through a hole centrally located in key 28 and as shown on FIGURE 1, the stem end is flanged over key 28 to securely retain the key thereon.

To attach stem 27 with key 28 thereon to cylinder 21, one of the projections 29 of key 28 is first inserted into one of tthe apertures 30 in the cylinder. Then by using this engagement as a pivot point, the opposite projection 29 on the key can be forced into the aperture 30 on the split side of the cylinder. Upon arrival of the projection 29 at the aperture 30, the split cylinder will snap shut, locking the key to the cylinder in a semi-rigid position but allowing for limited relative movement of adjustment between the valve cylinder 21 and stem 27. This arrangement is advantageous in that it allows for certain possible manufacturing variations in the valve parts to be compensated for as where the mixing chamber 20 which receives the valve cylinder 21 and the guide for stem 27 are not precisely aligned.

Positioned in each sleeve opening 16 is a seal means shown in the form of an O-ring 24 having its outer diameter engaging the periphery of the opening. With the expansible split cylinder 21 as a valve member, it is compressed slightly upon being inserted into mixing chamber 20 wherein it expands against the O-rings 24 to resiliently urge these O-rings outwardly into sealing contact with the inner wall of bore 14 in the valve body 10.

The expanding force from split cylinder 21 can be selected to be of sufficient magnitude to press O-rings 24 outwardly against bore 14 and maintain a seal against leakage between the seal means and the bore even at the highest expected fluid operating pressure that is anticipated for the valve in use. As wear on the O-rings 24 occurs in use, the expanding split cylinder will compensate for the wear and maintain force on the O-rings to keep these seal means in intimate contact with the body bore 14 and prevent fluid leakage. This compensating action of the resilient split cylinder valve member on O-rings 24 can be used without employing the circumscribing static seal means described hereinafter although the use of both features in a valve construction will give improved results and longer wear life without leakage either between inlets or from the inlets to the outlet.

Where the feature of the expandable split cylinder valve member is employed, it will be appreciated that the force of the expanding cylinder continuously presses outwardly against the O-rings 24 so as to set up effective seals against fluid leakage both between each O-ring 24 and the bore 14 of body 10 and between each O-ring 24 and the exterior of split cylinder 21. In such circumstance, the O-rings 24 need not be closely sized to exactly fit the diameter of openings 16 in sleeve 15 since the sealing contact with openings 16 is not relied on to avoid leakage. However, the perimeter of each opening 16 does form a backing for the O-ring 24 associated therewith against the radially outwardly acting fluid pressure to which the O-ring 24 is subjected from the valve inlet port and the O-ring should closely approximate diameter of opening 16. Also with the expandable split cylinder valve member and its action of continuously pressing the O-rings 24 into effective sealing relationship to bore 14 and cylinder 21, the provision of close tolerance fits between sleeve 15 and cylinder 21 is not necessary such that manufacturing and assembly costs can be reduced while still providing a single handle valve which in service will prevent cross-leakage of fluids between the inlets where there are unbalanced pressures within the inlets and prevent leakage to the outlet at high fluid inlet pressures.

Circumscribing each sleeve opening 16 and spaced therefrom is a groove 25 formed in the outer cylindrical wall of sleeve 15. The groove encircling each opening 16 has a static seal means shown in the form of an O-ring 26 mounted therein. This static seal means is not subject to wear since there is no relative movement between sleeve 15 and body 10 in conjunction with the use of the valve. Thus, the O-rings 26 may be assembled under a predetermined load or compression to effect complete seals circumscribing the inlet ports and between the bore 14 of body 10 and sleeve 15. When the sleeve 15 is inserted in the bore 14, although the bore and sleeve may not have a close tolerance fit therebetween, the O-rings 26 will be compressed between the bottom of the grooves 25 and the bore 14, establishing an effective seal separately circumscribing each sleeve opening 16.

The use of static seal means circumscribing the floating seal O-ring 24 at each inlet port affords many advantages in valve operation and this feature may be used in the absence of the split cylinder valve member mentioned hereinbefore. However, as previously noted both features may advantageously be used together in a single handle valve. Since the static seal means seals the space between the bore 14 and sleeve 15, O-rings 24 need only to seal the space between sleeve 15 and cylinder 21 so that the expanding action of split cylinder 21 may be dispensed with. Since the O-rings 24 are constantly urged toward the piston by the operating pressures of the inlet fluids, the sealing forces urging these O-rings against cylinder 21 are always directly proportional to the inlet fluid operating pressures and never in excess of that force which is necessary to effect a seal. O-rings 24 need not be rigidly held in the sleeve openings 16 and need not be preloaded between the bore 14 of body 10 and cylinder 21. Thus an unsplit cylindrical valve member may be used and O-rings 24 be left free to float within sleeve openings 16. Consequently, the O-rings 24 will be free to be constantly urged toward the cylinder valve member by the pressure of the inlet fluids entering through inlet ports 12 and 13 to maintain a seal between the cylinder and the sleeve. In this way, any wear and deformation of the O-rings 24 is automatically compensated for to provide an effective seal at all times.

Thus, any normal production variations in diameter, eccentricity and machining tolerances can be compensated for, making the valve easier and less expensive to manufacture. Moreover, the circumscribed sealing arrangement provides positive sealing at each inlet port and any tendency for cross-leakage between the inlet ports or leakage to the valve outlet at high or unbalanced pressures is eliminated.

Where circumscribing seals such as O-rings 26 are employed, as mentioned above, they are preloaded by the assembly operation such that they are firmly pressed between the bore 14 and sleeve 15 to effectively seal the space between bore 14 and sleeve 15. Thus, where the expandable split cylinder valve member is not employed and in its place an unsplit cylinder used, each O-ring 24 will be selected of a size to make intimate and sealing contact with the perimeter of the particular opening 16 in which it is disposed. On the other hand, O-rings 24 need not be of a thickness sufficient to seal against bore 14 since the space between bore 14 and sleeve 15 is sealed by the circumscribing O-rings 26. O-rings 24 are, as referred to above, floating, with the fluid inlet pressure acting to press the O-rings against the cylinder valve member and against the perimeter of opening 16 in which it is disposed whereby O-rings 24 bridge and seal the space between sleeve 15 and the cylinder valve member. Here again, the necessity for close tolerances between the cylinder valve member and sleeve 15 and between sleeve 15 and bore 14 of body 10 is avoided while cross-leakage and leakage to the valve outlet at unbalanced and high fluid inlet pressures will not occur.

The upper portion of bore 14 is internally threaded to receive the lower correspondingly threaded end of a cap 34, the cap 34 completing the valve body 10. Cap 34 is provided with an inner cavity 35 which forms a continuation of mixing chamber 20 communicating with such chamber through valve cylinder 21. Passageways 36 lead from the cavity to form the fluid outlet port from the valve body.

Cap 34 retains a suitable swing spout such as conventionally provided on water valves associated with kitchen sinks, etc. This spout may have a ring portion 37 encircling the upper end of body 10 to be swingably associated with the valve, with an outlet neck 38 extending from ring portion 37 and communicating with the passageways 36. A sealing ring 41 is mounted in a groove encircling the outer surface of the body 10 to provide a seal between ring portion 37 and body 10 while a similar sealing ring 42 is mounted in a groove to provide a seal around the upper end of ring portion 37.

Cap 34 is also provided with a central bore forming a guide for stem 27 which passes therethrough. A sealing ring 43 is mounted in a groove formed in the bore of the cap to prevent leakage of fluid around the stem.

Any suitable means may be used on top of the body 10 of the valve to facilitate manipulation of the stem 27 in operating the valve. The means shown on the drawings is only to indicate how reciprocating and rotary movements can be imparted to valve cylinder 21 in operating the valve by means of a single lever type handle. As shown, a flanged disc 45 is rotatably mounted on the upper surface of cap 34. Disc 45 has a central bore through which operating stem 27 passes. A pair of spaced brackets 46 having a pivot rod 47 extending therebetween are rigidly mounted on disc 45 to constitute a pivot support means for a handle 48. Handle 48 is thus pivotally supported on rod 47. The handle 48 is bifurcated at its inner end to provide a pair of projections 49 which fit on either side of a reduced flat central portion 51 of operating stem 27 adjacent the upper end thereof. Thus rotation of disc 45 by swinging handle 48 will rotate cylinder 21 while up and down movement of handle 48 will cause reciprocating movement of cylinder 21 in sleeve 15. Disc 45 is retained on cap 34 by means of a ring 50 threaded onto the upper end of cap 34, with an inturned lip on ring 50 overlying the flanged periphery of disc 45.

In operation of the valve, fluid is not permitted to pass from either inlet port to the outlet port when cylinder 21 is in the closed or upper position as shown in FIGURES 1 and 2. Downward movement of cylinder 21 by pivotal movement of handle 48 brings part of the openings 23 of the ported areas into communication with one or both of the inlet ports 12 and 13 permitting fluid to enter the mixing chamber 20 and thence out through passageway 36. Up and down movement of the cylinder regulates the volume of fluid allowed to enter the valve. Rotational movement of cylinder 21 by handle 48 regulates the proportion of the two fluids entering from the inlet ports by bringing more or less of the openings 23 into communication with one or the other of the inlet ports. Fluid entering from the inlet ports is mixed in mixing chamber 20 in the interior of the valve from where it passes upwardly to passageway 36 and discharges through the outlet neck 38.

It will be appreciated that where a split expandable valve cylinder 21 is employed, the split 22 thereof should be prevented from becoming aligned with either of the inlet ports 12 or 13 since such occurrence would permit fluid flow even in the uppermost position of the valve cylinder. This limit to rotation of the split cylinder may be accomplished in a variety of manners. On the drawing, one approach is shown which involves removal of a limited arcuate portion of the flange of disc 45 to provide an arcuate groove as shown at 55. A pin 56 carried by cap 34 extends into this cut out arcuate portion. Thus, as the disc 45 moves upon rotative movements of the stem 27 and valve cylinder 21, the extent of movement is limited by pin 56 engaging one or the other ends of the arcuate groove 55. Of course, the length of groove 55 will be such that the valve cylinder 21 cannot be moved sufficiently to bring split 22 into alignment with either of inlet ports 12 and 13.

The mixing valve of the present invention may be constructed so as to be hydrostatically balanced by making the areas above and below the cylinder equal. This may be done, for example, by simply extending the length of operating stem 27 to the bottom of body 10 and providing a bore centrally through the closed end of sleeve 15 and body 10 to slidably receive the bottom end of the extended operating stem 27. The bore, of course, through the closed end of sleeve 15 and body 10 would be sealed against leakage in any suitable manner.

The specific embodiments of the invention which have been shown and described are illustrative only. It will be understood that many modifications may be made by persons skilled in the art without departing from the scope or spirit of the invention all of which modifications are intended as a part of the invention if within the scope of the appended claims.

We claim:
1. A mixing valve comprising
a body having a bore formed therein,
a plurality of fluid inlet ports formed in said body and communicating with said bore,
a fluid outlet port extending from said bore to the exterior of said body,
a sleeve stationarily disposed within said bore and defining therewithin a cylindrical mixing chamber, said sleeve having openings formed therein communicating between said inlet ports respectively and said mixing chamber,
a hollow cylindrical valve member movably mounted in said chamber to control flow of fluids from said inlet ports to said outlet port, said valve member having ported areas selectively movable into communication with said sleeve openings,
an operating stem extending axially from said cylindrical valve member to a point outside said body,
an inlet seal O-ring freely and replaceably supported within each sleeve opening extending around the perimeter of the opening with which it is associated, each said inlet seal O-ring being pressed between the wall of said bore and the exterior of said valve member to seal against fluid leakage between said sleeve and said cylindrical valve member, and
a static seal O-ring disposed between said bore and said sleeve and replaceably mounted in a groove on the exterior of said sleeve circumscribing each of said sleeve openings and the inlet seal O-ring associated therewith, said circumscribing static seal O-ring for each sleeve opening being pressed between said bore and said sleeve to prevent cross leakage between said inlet ports and leakage to said outlet port from said inlet ports.

2. A mixing valve comprising
a body having a bore formed therein,
a plurality of fluid inlet ports formed in said body and communicating with said bore,
a fluid outlet port extending from said bore to the exterior of said body,
a sleeve stationarily disposed within said bore and defining therewithin a cylindrical mixing chamber, said sleeve having openings formed therein communicating between said inlet ports respectively and said mixing chamber,
a hollow cylindrical valve member movably mounted in said chamber to control flow of fluids from said inlet ports to said outlet port, said valve member being longitudinally split to be resiliently expandable within said chamber,
said valve member having ported areas selectively movable into communication with said sleeve openings,
an operating stem extending axially from said cylindrical valve member to a point outside said body,
an inlet seal ring freely supported within each sleeve opening extending around the perimeter of the opening with which it is associated,
said split cylindrical valve member being compressed within said chamber whereby it exerts radial force against said inlet seal rings to press them into effective sealing relation with said bore and said valve member to prevent cross leakage between said inlet ports and leakage to said outlet port from said inlet ports.

3. A mixing valve as recited in claim 2 wherein said inlet seal rings each comprise an O-ring, and said operating stem has an adjustable connection with said valve member permitting limited relative movement therebetween such that said valve member can adjust relative to said stem to accommodate minor variations in the positions of the bore, O-rings and split cylindrical valve member.

4. A mixing valve comprising
a body having a cylindrical bore formed therein,
a pair of fluid inlet ports formed in said body and communicating with said bore from diametrically opposite sides of said bore,
a fluid outlet port spaced along said bore from said inlet ports and extending from said bore to the exterior of said body,
a sleeve stationarily disposed within said bore and defining therewithin a cylindrical mixing chamber, said sleeve having openings formed in the opposite side walls thereof communicating between said inlet ports respectively and said mixing chamber,
a hollow cylindrical valve member movably mounted in said chamber to control flow of fluids from said inlet ports to said outlet port, said valve member being longitudinally split to be resiliently expandable within said chamber,
said valve member having ported areas selectively movable into communication with said sleeve openings,
an operating stem extending axially from said cylindrical valve member to a point outside said body,
an inlet seal ring freely supported within each sleeve opening extending around the perimeter of the opening with which it is associated,
said split cylindrical valve member being compressed within said chamber whereby it exerts radial force against said seal rings to press them into effective sealing relation with said bore and said valve member, and
a static seal ring disposed between said bore and said sleeve and circumscribing each of said sleeve openings and the inlet seal ring associated therewith, said static seal rings being disposed in grooves formed in the exterior surface of said sleeve and being pressed between said bore and said sleeve to effectively seal against fluid leakage between these elements.

5. A mixing valve as recited in claim 4 wherein said operating stem has an adjustable connection with said split cylindrical valve member permitting limited relative movement therebetween such that said valve member can adjust relative to said stem to accommodate minor variations in the positions of the bore, seal rings and split cylindrical valve member.

References Cited by the Examiner
UNITED STATES PATENTS

| | | | |
|---|---|---|---|
| 2,202,216 | 5/1940 | Madsen | 137—625.17 X |
| 2,511,477 | 6/1950 | Mueller | 251—182 |
| 2,566,071 | 8/1951 | Schobert | 251—182 |
| 2,674,436 | 4/1954 | Jones | 251—363 X |
| 2,845,948 | 8/1958 | Parker | 137—625.17 |
| 2,854,999 | 10/1958 | Moen | 137—625.17 |
| 2,968,313 | 1/1961 | Camp | 251—84 X |
| 3,000,393 | 9/1961 | Maynard | 137—625.41 X |
| 3,103,231 | 9/1963 | Moen | 137—625.17 X |
| 3,185,176 | 5/1965 | Webb | 137—625.41 |

M. CARY NELSON, *Primary Examiner.*

A. JAFFE, E. FEIN, *Assistant Examiners.*